US 6,944,585 B1

(12) United States Patent
Pawson

(10) Patent No.: US 6,944,585 B1
(45) Date of Patent: Sep. 13, 2005

(54) DYNAMIC PERSONALIZED CONTENT RESOLUTION FOR A MEDIA SERVER

(75) Inventor: David J. Pawson, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 866 days.

(21) Appl. No.: 09/653,928

(22) Filed: Sep. 1, 2000

(51) Int. Cl.[7] .............................................. G06F 9/45
(52) U.S. Cl. ...................... 703/22; 348/14.01; 725/34
(58) Field of Search ...................... 703/22; 348/14.01; 725/34, 39; 709/25

(56) References Cited

U.S. PATENT DOCUMENTS

| 6,260,192 B1 * | 7/2001 | Rosin et al. .................. 725/39 |
| 6,317,790 B1 * | 11/2001 | Bowker et al. ............. 709/225 |
| 6,698,020 B1 * | 2/2004 | Zigmond et al. ............. 725/34 |
| 6,774,926 B1 * | 8/2004 | Ellis et al. ............... 348/14.01 |

FOREIGN PATENT DOCUMENTS

| WO | WO 99/26415 | 5/1999 | ............ H04N 7/10 |
| WO | WO 00/29982 | 5/2000 | ........... G06F 17/30 |

OTHER PUBLICATIONS

Computer Security (Understanding Computers Series), Time-Life, 1986, ISBN 0-8094-5670-2, pp. 23, and 74-75.*
Susanne Boll, et al., "ZYX-A Semantic Model For Multimedia Documents and Presentations," Proceedings of the 8th IFIP Conference in Data Semantics (DS-8): "Semantic Issues in Multimedia Systems", Jan. 5-8, Rotorua, New Zealand, 1999, XP-002201340, pp. 1-20.
Boll, S. et al., "Z/Sub Y/X-a semantic model for multimedia documents and presentations," 1999, XP-002203181, 1 page.

* cited by examiner

Primary Examiner—Kevin J. Teska
Assistant Examiner—Ed Garcia-Otero
(74) Attorney, Agent, or Firm—Hickman Palermo Truong & Becker LLP; Christopher J. Brokaw

(57) ABSTRACT

A streaming media server is provided for dynamically resolving a request for digital content based upon the identity of the requester. The digital content may be specifically tailored to the demographics of the viewer, and need not be physically stored in sequence. Information about a viewer of digital video is stored within a user profile. The collection of all user profiles is maintained by a profile manager. When a viewer requests a digital data stream from the media server, a content resolver, coupled to the media server, determines how to service the request based upon the appropriate user profile. In certain embodiments, the content resolver may be configured to send targeted advertisements towards the requester of the digital data stream. In other embodiments, the content resolver may be configured to send personalized information pertaining to the requesting user. In other embodiments, the content resolver may personalize the requested content according to the user profile.

22 Claims, 3 Drawing Sheets

DYNAMIC PERSONALIZED CONTENT RESOLUTION FOR A MEDIA SERVER

FIELD OF THE INVENTION

The present invention relates to a method and apparatus for processing audio-visual information, and more specifically, to a method and apparatus for dynamically resolving content requests of a streaming media server.

BACKGROUND OF THE INVENTION

In recent years, the media industry has expanded its horizons beyond traditional analog technologies. Audio, photographs, and even feature films are now being recorded or converted into digital formats. Media systems are available to present digital content to viewers in increasing numbers.

Certain media systems allow clients to request digital content from the media server by name. Just as commercials are interspersed during a movie played on broadcast television, it is desirable to play content unrelated to the original data stream request, such as a commercial, in a pointcast or multicast digital media presentation. For purposes of explanation, the problem of merging unrelated content into a requested digital data stream by a client will be explained in reference to commercials. It should be understood that the unrelated content may be used for any purpose, and is not limited to any particular style, purpose, or format, such as a commercial.

In some media systems, presenting commercials to a client in a digital data stream is performed by storing the commercials in the same binary file as the requested content. Commercials are stored physically in the binary file relative to where they appear in the requested data stream. Every client who requests the binary file would be shown the same commercials at the same point in the data stream.

Alternately, the commercials shown in a digital video presentation can stored in a different binary file as the requested content. Commercials in this case are statically mapped during presentation to the client. For example, a request by a client for a 30 minute episode of "M*A*S*H" might result in the media server streaming the first 10 minutes of the show, followed by a commercial, followed by the next 10 minutes of the show, follow by a commercial, followed by the final 10 minutes of the show. The entire presentation of "M*A*S*H" and the two commercials are delivered to the requesting client in one contiguous data stream. However, the selection of which commercials to intersperse with the requested data stream is done without thought to the identity of the requester. Thus, while the particular commercials inserted into the data stream for two different requests for "M*A*S*H" may differ, there is no guarantee that the commercials are appropriate for the demographics of the requesting audience.

As the commercial popularity of digital media spreads, there will be a growing need to present additional content specifically tailored to the individual or the demographics of the viewer, and which need not be physically stored in sequence as presented to the requester. Accordingly, it would be desirable for a presenter of digital media to generate and present content in response to requests for digital data streams to provide for user-specific customizations and targeted advertising. Further, it would be desirable for a presenter of digital media to allow customization of the viewable content provided by the media server based upon a user's preferences.

SUMMARY OF THE INVENTION

A method and apparatus are provided for dynamic content resolution based upon the requester of digital media from a streaming media server. In one aspect, embodiments of the invention use a user profile to store information pertaining to requesters of digital audio-visual data. Using the user profile, a content resolver, coupled to the media server, determines the content to include in the digital audio-visual data stream sent by the media server according to a set of configurable rules.

As a result of the techniques described herein, dynamic content is available for presentation to the viewer and, consequently, customized content, such as advertising, may be seamlessly inserted into, or content may be selectively removed from, a digital audio-visual data stream based on the profile of a particular requestor.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for dynamic creation of logical content in a streaming media server is provided. There have been many advances in both functionality and performance of the media server in recent years. The present invention advances the teachings of the following patents and pending applications, all of which are hereby incorporated by reference: U.S. application Ser. No. 08/502,480 filed on Jul. 14, 1995, now U.S. Pat. No. 5,659,539, U.S. application Ser. No. 09/128,224 filed on Aug. 3, 1998 and concurrently filed U.S. application entitled "Dynamic Quality Adjustment Based Upon Changing Streaming Constraints" invented by David J. Pawson.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
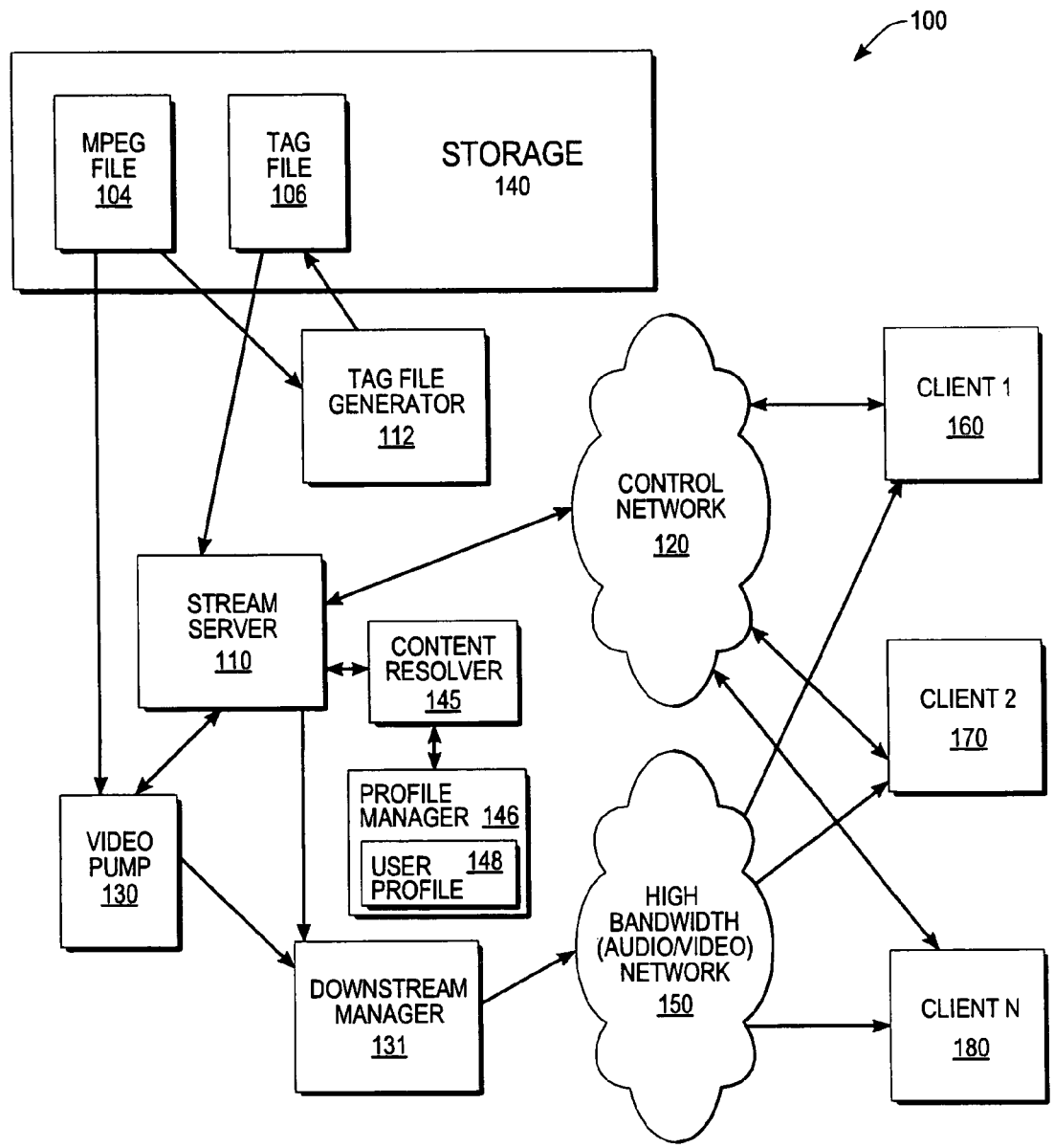
FIG. 1 is a block diagram of an audio-visual information delivery system according an embodiment of the present invention.

FIG. 1 is a block diagram illustrating an audio-visual information delivery system 100 according to one embodiment of the present invention. Audio-visual information delivery system 100 contains a plurality of clients (1–n) 160, 170 and 180. The clients (1–n) 160, 170 and 180 generally represent devices configured to decode audio-visual information contained in a stream of digital audio-visual data. For example, the clients (1–n) 160, 170 and 180 may be set top converter boxes coupled to an output display, such as a television.

As shown in FIG. 1, the audio-visual information delivery system 100 also includes a stream server 110 coupled to a control network 120. Control network 120 may be any network that allows communication between two or more devices. For example, control network 120 may be a high bandwidth network, an X.25 circuit, an electronic industry association (EIA) 232 (RS-232) serial line or, preferably, an IP network.

The clients (1–n) 160, 170 and 180, also coupled to the control network 120, communicate with the stream server 110 via the control network 120. For example, clients 160, 170 and 180 may transmit requests to initiate the transmission of audio-visual data streams, transmit control information to affect the playback of ongoing digital audio-visual transmissions, or transmit queries for information. Such queries may include, for example, requests for information about which audio-visual data streams are currently available for service.

The audio-visual information delivery system 100 further includes a video pump 130, a mass storage device 140, a content resolver 145, a profile manager 146, and a high bandwidth network 150. The video pump 130 is coupled to the stream server 110 and receives commands from the stream server 110. The video pump 130 is coupled to the mass storage device 140 such that the video pump 130 stores and retrieves data from the mass storage device 140. The mass storage device 140 may be any type of device or devices used to store large amounts of data. For example, the mass storage device 140 may be a magnetic storage device, an optical storage device, or a combination of such devices. The mass storage device 140 is intended to represent a broad category of non-volatile storage devices used to store digital data, which are well known in the art and will not be described further.

The tasks performed during the real-time transmission of digital audio-visual data streams are distributed between the stream server 110 and the video pump 130. Consequently, stream server 110 and video pump 130 may operate in different parts of the network without adversely affecting the efficiency of the system 100.

While networks 120 and 150 are illustrated as different networks for the purpose of explanation, networks 120 and 150 may be implemented on a single network.

In addition to communicating with the stream server 110, the clients (1–n) 160, 170 and 180 receive information from the video pump 130 through the high bandwidth network 150. The high bandwidth network 150 may be any type of circuit-style network link capable of transferring large amounts of data. For example, in a preferred embodiment, the high bandwidth network 150 is an IP network.

The audio-visual information delivery system 100 of the present invention permits a server, such as the video pump 130, to transfer large amounts of data from the mass storage device 140 over the high bandwidth network 150 to the clients (1–n) 160, 170 and 180 with minimal overhead. In addition, the audio-visual information delivery system 100 permits the clients (1–n) 160, 170 and 180 to transmit requests to the stream server 110 using a standard network protocol via the control network 120. In one embodiment, the underlying protocol for the high bandwidth network 150 and the control network 120 is the same. The stream server 110 may consist of a single computer system, or may consist of a plurality of computing devices configured as servers. Similarly, the video pump 130, content resolver 145, and profile manager 146 may each consist of a single server device, or may include a plurality of such servers.

The blocks of FIG. 1, such as stream server 110, tag file generator 112, video pump 130, downstream manager 131, content resolver 145, and profile manager 146, represent logical functions and are shown separately for ease of explanation. The functions can be integrated as part of a larger functional module or can be separately callable modules.

To receive a digital audio-visual data stream from a particular digital audio-visual file, a client (1–n) 160, 170 or 180 transmits a request. According to one embodiment, the stream server 110 receives the request. In response to the request, the stream server 110 transmits the request to the content resolver 145. In another embodiment, the request is received directly by the content resolver 145. The content resolver 145 determines how to service the request by accesses a user profile 148 for the particular requesting user. A user profile 148 is a collection of information about a particular user and is stored in the profile manager 146.

In one embodiment, a user profile 148 is established for each user using the system 100. For example, a family of four members with one client 160 to watch a digital presentation would each be assigned a separate user profile 148. Thus, each user in the family would have a separate user profile 148. In this case, each member of the family would identify themselves to the system 100 using a username and password combination, or other well-known means in the art to establish identity. In another embodiment, a user profile 148 is established for each client 160. In the above example involving the family of four, only one user profile 148 would be established corresponding to the family's one client 160.

After the content resolver 145 determines how to service the request, the content resolver 145 transmits information identifying both the content of the digital audio-visual data stream and the particular requesting user to the stream server 110. The stream server 110 transmits commands to the video pump 130 to cause video pump 130 to transmit the customized digital audio-visual data stream to the requesting user.

The commands sent to the video pump 130 from the stream server 110 include control information specific to the user request. For example, the control information identifies the desired digital audio-visual file, the beginning offset of the desired data within the digital audio-visual file, and the address of the client. In order to create a valid digital audio-visual stream at the specified offset, the stream server 110 may also send "prefix data" to the video pump 130 and may request the video pump 130 to send the prefix data to the client. Prefix data is data that prepares the client to receive digital audio-visual data from the specified location in the digital audio-visual file.

The video pump 130, after receiving the commands and control information from the stream server 110, begins to retrieve digital audio-visual data from the specified location in the specified digital audio-visual file on the mass storage device 140.

The video pump 130 transmits any prefix data to the client, and then seamlessly transmits digital audio-visual data retrieved from the mass storage device 140 beginning at the specified location to the client via the high bandwidth network 150.

The requesting client receives the digital audio-visual data stream, beginning with any prefix data. The client decodes the digital audio-visual data stream to reproduce the audio-visual sequence represented in the digital audio-visual data stream.

The operation of providing personalized digital content to a requester will now be described with reference to FIG. 2. In one embodiment, shown in step 202, the particular user sends a signal to the stream server 110 to request a particular digital audio-visual data stream. The stream server 110 transmits data that identifies the requested data stream and may send a user identifier 181 that identifies the requesting user to the content resolver 145. A user identifier 181 is a unique identification tag for a user. Thus, each user will have a different user identifier 181. Alternatively, if the stream server 110 does not send the user identifier 181, then the control network 120 may determine the user identifier 181.

In another embodiment, also shown in step 202, the request for a particular digital audio-visual data stream is received directly by the content resolver 145. Information identifying the particular user is available in the request to allow the content resolver 145 to generate the user identifier 181.

The content resolver 145 is responsible for determining how to service a request for content by a particular user. For example, the content resolver 145 determines what additional digital audio-visual content, if any, should be sent or removed with the requested digital audio-visual data stream to the particular client (1–n) 160, 170, or 180.

As shown in step 204, the content resolver 145 transmits the user identifier 181 to the profile manager 146. The profile manager 146 stores information pertaining to the users of clients (1–n) 160, 170, and 180. Such information may include, for example, their identity, purchasing habits, service status, and viewing preferences. The functionality of the profile manager 146 may be accomplished through the employment of a data storage system. Such data storage systems, such as a relational database, are well known to those in the art, and will not be discussed further. The sum of information available from the profile manager 146 on a particular user is called the user profile 148. Information stored for a particular user can be retrieved using the user identifier 181, as shown in step 206. For example, if a relational database is used, then the user identifier 181 is used as a primary key to retrieve the user profile 148.

Information about users stored in the user profile 146 can be imported from any source. As more information about a user enables a higher degree of customized content, it is advantageous to import information about a user into the profile manager 146 from as many sources as possible. For example, information about a user may be imported from other software applications, databases, or augmented over time based upon interaction history with the stream server 110.

As shown in step 208, the content resolver 145 uses the information obtained in the user profile 148, in accordance with a set of stored rules 149, to tailor any additional audio-visual content to the demographics of the requesting user.

For example, if a user profile 148 indicates that the requesting user is an adult male and has recently purchased a truck online, then the content resolver 145 may include a commercial for the Club®, an automobile theft deterrent device, in the audio-visual data stream sent to the requesting user. Alternately, if the user profile 148 indicates that the requesting user is a married individual with a 1-year-old child who has a birthday within the next month, then the content resolver 145 may include a commercial for children's clothes in the audio-visual data stream sent to the requesting user. Alternately, if the user profile 148 indicates that the requesting user has paid for premium service, then the content resolver 145 might not include any commercials at all in the audio-visual data stream sent to the requesting user. Further, if the user profile 148 indicates that the requesting user is tardy on his bill, then the content resolver 145 may include a reminder notice at the beginning of the audio-visual data stream sent to the requesting user, or not send the audio-visual data stream to the requesting user at all.

The content resolver 145 can be configured to selectively remove content from the original presentation. For example, if a user profile 148 indicates that the requesting user has young children, then the content resolver 145 may cut particular objectionable scenes from a requested movie with an R rating to effectively give the movie a PG rating. Alternately, content resolver 145 may cut or replace objectionable audio segments that contain profanity with alternative audio tracks or with closed-captioned information.

As described above, the content resolver 145 can be configured by a set of stored rules 149 to use the information in the user profile 148 to customize any additional content to include in the audio-visual data stream sent to the requesting client (1–n) 160, 170, or 180. The above examples use the addition of one commercial for illustration purposes only. The content resolver 145 may be configured to send or remove as many segments of additional content as expressed in the set of stored rules 149.

The set of stored rules 149 allows for much flexibility. The set of stored rules 149 defined in the content resolver 145 may consider information external to the information contained in the profile manager 146, such as time of an event, weather, or season. Also, the rules defined in the content resolver 145 may be given different weights, enabling certain criteria to be given more consideration than others. Default settings can be established using the set of stored rules 149 to resolve content in a certain manner. For example, sample defaults a content resolver 145 might be configured to provide could include showing specific commercials, showing movie trailers or previews at the beginning of each digital movie, or displaying close captioned text in a specific language, such as English.

A particular user could indicate in his or her user profile 148 particular preferences regarding the display of digital video. For example, a particular user might prefer to watch a movie in letterbox version, if available. By storing this information in the user profile 148 of the particular user, the content resolver 145 can indicate to the stream server 110 that the letterbox version of the requested digital content be transmitted to the client. Conversely, if that same user does not have a preference in his or her user profile 148 for viewing letterbox movies, a standard version of the requested content is sent.

Figure 3:
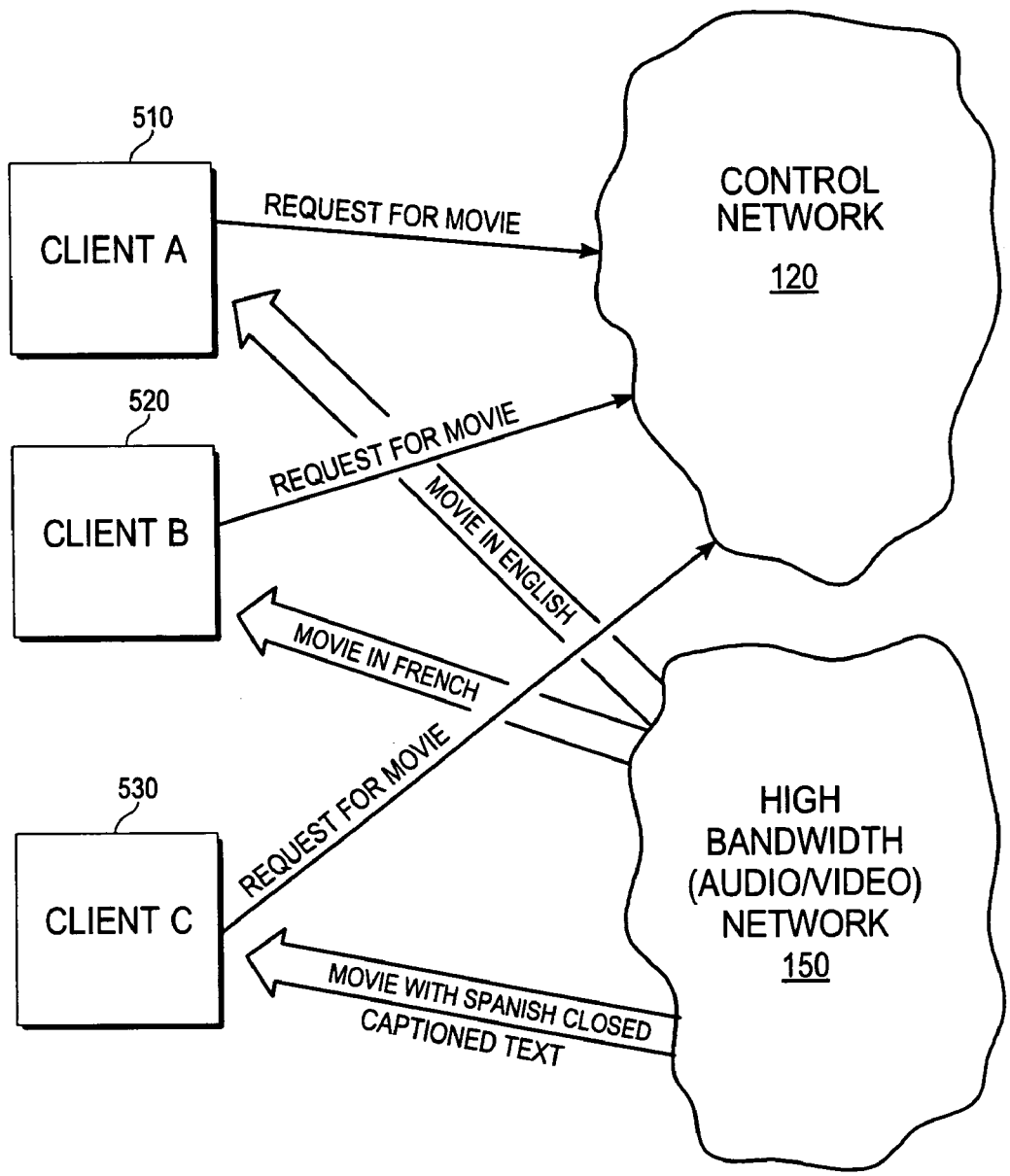
FIG. 3 is a block diagram illustrating the operation of dynamic content resolution according to one embodiment of the invention.

FIG. 3 depicts another example of storing client preferences in the user profile 148 to tailor the digital media presentation. Client A 510, client B 520, and client C 530 are shown requesting the movie "The Matrix" from the control network 120. The user of client A speaks English, the user of client B speaks French, and the user of client C prefers watching movies with Spanish subtitles. The users of client A 510, client B 520, and client C 530 have each recorded their preferences in each of their corresponding user profiles 148. When the users of client A 510, client B 520, and client C 530 make the same request from the control network 120 to watch "The Matrix," the content resolver 145 in each case resolves the request differently. The user of client A 510 would be sent a digital data stream from the high bandwidth network 150 with an audio track in English, while the user of client B 520 would be sent a digital data stream from the high bandwidth network 150 with an audio track in French, and the user of client C 530 would be sent a digital data stream from the high bandwidth network 150 with close captioned text in Spanish. This example assumes that the different audio, video, and close captioned information are available in storage 140. Thus, a particular user's request for digital media is resolved in the content resolver 145 according to the user's preferences recorded in the corresponding user profile 148.

As mentioned previously, the content resolver 145 may add or remove content when configuring the requested audio-visual data stream. In one embodiment, the added or removed content represents bounded segments of time in the presentation. For example, a commercial of three minutes may be added or 1.24 minutes of content may be removed. In another embodiment, the added or removed content may be limited to a particular audio track or segment of video content in the presentation. For example, an additional sound track may be added or a portion of objectionable content removed.

Figure 2:
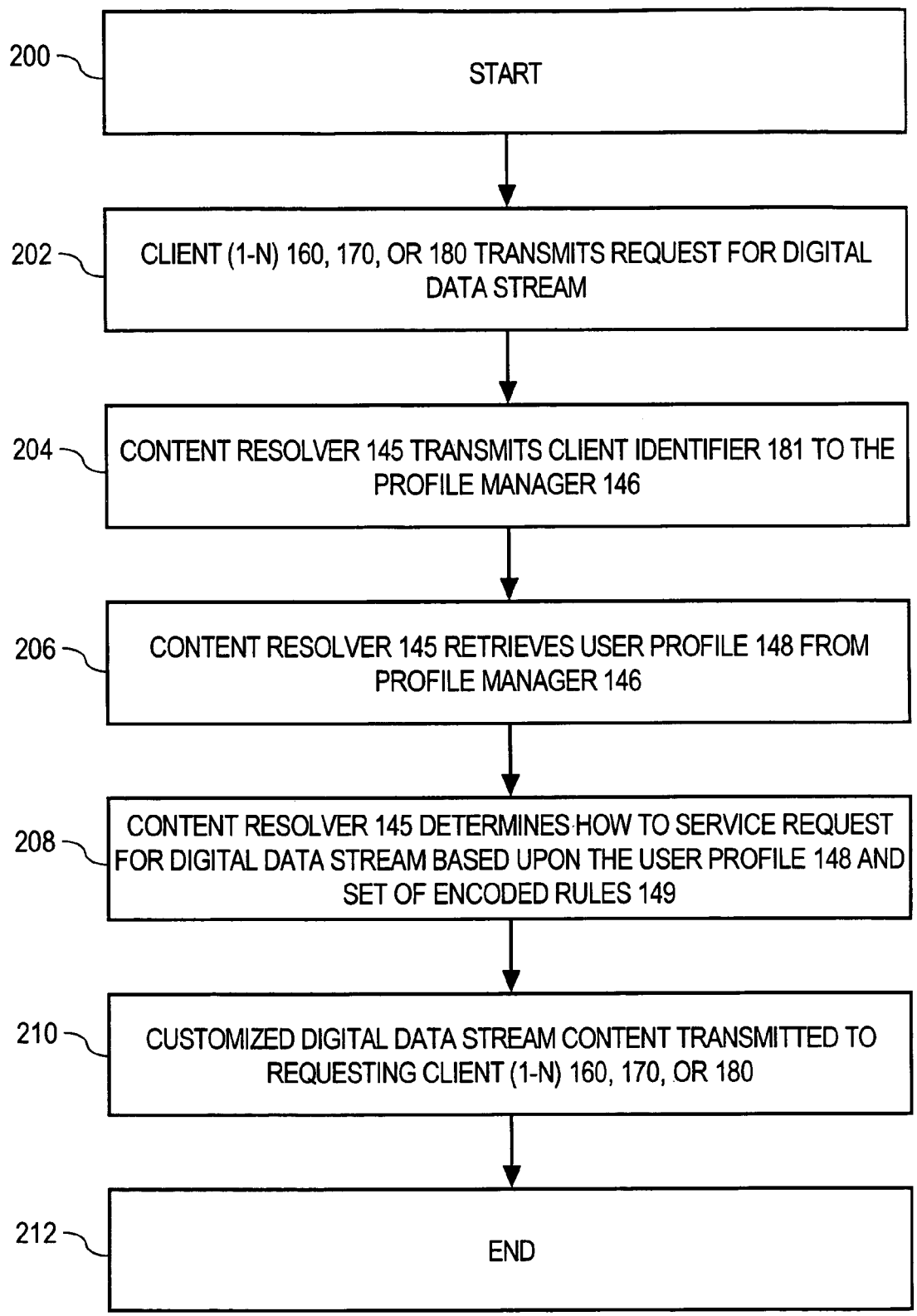
FIG. 2 is a flow diagram illustrating the operation of the content resolver according to one embodiment of the invention.

As shown in step 210 in FIG. 2, after the content resolver 145 has determined what additional content to include in the audio-visual data stream, the content resolver 145 transmits the logical content to the stream server 110. The stream server 110 transmits commands to the video pump 130 to cause the video pump 130 to transmit the customized digital audio-visual data stream to the client (1–n) 160, 170, or 180.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for constructing digital data streams at a media server, comprising:
   at said media server, receiving a first request for specified content from a first user, wherein said specified content includes data representing an original series of frames of digital information;
   consulting a first user profile associated with said first user;
   determining the composition of a first digital data stream to send to said first user from said media server based upon said first user profile and said specified content;
   constructing said first customized digital data stream, where the step of constructing said first customized digital data stream includes performing at least one of:
      removing, from said original series of frames, one or more frames, wherein said removed frames are selected based on said first user profile,
      modifying audio information, associated with one or more of said original series of frames, based on said first user profile, and
      inserting additional frames of video, into said original series of frames, based on said first user profile, wherein said additional frames of video do not modify any frame in the original series of frames;
   sending said first customized digital data stream from said media server to said first user;
   at said media server, receiving a second request for said specified content from a second user;
   consulting a second user profile associated with said second user;
   determining the composition of a second digital data stream to send to said second user from said media server based upon said second user profile and said specified content;
   constructing said second customized digital data stream, where the step of constructing said second customized digital data stream includes performing at least one of:
      removing, from said original series of frames, one or more frames, wherein said removed frames are selected based on said second user profile,
      modifying audio information, associated with one or more of said original series of frames, based on said second user profile, and
      inserting additional frames of video, into said original series of frames, based on said second user profile, wherein said additional frames of video do not modify any frame in the original series of frames; and
   sending said second customized digital data stream from said media server to said second user,
   wherein said first customized digital data stream is different than said second customized digital data stream.

2. The method of claim 1, wherein said step of sending said first customized digital data stream and said step of sending said second customize digital data stream are performed over a network in real time.

3. The method of claim 1, wherein said step of sending delivering said first customized digital data stream to said first user comprises:
   storing said first customized digital data stream in a fixed storage medium; and
   allowing said first user to access said fixed storage medium.

4. The method of claim 1, wherein said additional frames of video include both audio and visual information.

5. The method of claim 1, wherein said step of sending said first customized digital data stream from said media server to said first user includes:
   presenting said additional frames of video to said first user concurrently with said specified content.

6. The method of claim 1, wherein said step of constructing said first customized digital data stream is performed by consulting a set of stored rules regarding at least one member selected from the group consisting of: identity of the first user, purchasing habits of the first user, service status of the first user, and viewing preferences indicated in said first user profile.

7. The method of claim 1, wherein said additional frames of video include
   at least one member selected from the group consisting of: advertisements, personalized statements regarding said first user's bill, and information regarding special promotions.

8. The method of claim 1, wherein said original series of frames of digital information are physically stored in more than one file.

9. The method of claim 1, wherein said first customized digital data stream includes video information corresponding to closed captioned text in a language indicated in said first user profile.

10. The method of claim 1, where said first customized digital data stream includes audio translations in a language indicated in said first user profile.

11. The method of claim 1, where said first customized digital data stream includes video information corresponding to a letterbox version of said specified content.

12. A computer-readable medium carrying one or more sequences of instructions for constructing digital data streams at a media server, wherein execution of the one or more sequences of instructions by one or more processors causes the one or more processors to perform the steps of:

at said media server, receiving a first request for specified content by said from a first user, wherein said specified content includes data representing an original series of frames of digital information;

consulting a first user profile associated with said first user;

determining the composition of a first digital data stream to send to said first user from said media server based upon said first user profile and said specified content;

constructing said first customized digital data stream, where the step of constructing said first customized digital data stream includes performing at least one of:
 removing, from said original series of frames, one or more frames, wherein said removed frames are selected based on said first user profile,
 modifying audio information, associated with one or more of said original series of frames, based on said first user profile, and
 inserting additional frames of video, into said original series of frames, based on said first user profile, wherein said additional frames of video do not modify any frame in the original series of frames;

sending said first customized digital data stream from said media server to said first user;

at said media server, receiving a second request for said specified content from a second user;

consulting a second user profile associated with said second user;

determining the composition of a second digital data stream to send to said second user from said media server based upon said second user profile and said specified content;

constructing said second customized digital data stream, where the step of constructing said second customized digital data stream includes performing at least one of:
 removing, from said original series of frames, one or more frames, wherein said removed frames are selected based on said second user profile,
 modifying audio information, associated with one or more of said original series of frames, based on said second user profile, and
 inserting additional frames of video, into said original series of frames, based on said second user profile, wherein said additional frames of video do not modify any frame in the original series of frames; and sending said second customized digital data stream from said media server to said second user, wherein said first customized digital data stream is different than said second customized digital data stream.

13. The computer-readable medium of claim 12, wherein said step of sending said first customized digital data stream and said step of sending said second customized digital data stream is performed over a network in real time.

14. The computer-readable medium of claim 12, wherein said step of sending said customized digital data stream to said first user comprises:
 storing said first customized digital data stream in a fixed storage medium; and
 allowing said first user to access said fixed storage medium.

15. The computer-readable medium of claim 12, wherein said additional frames of video include both audio and visual information.

16. The computer-readable medium of claim 12, wherein said step of sending said first customized digital data stream from said media server to said first user includes:
 presenting said additional frames of video to said first user concurrently with said specified content.

17. The computer-readable medium of claim 12, wherein said step of constructing said first customized digital data stream is performed by consulting a set of stored rules regarding at least one member selected from the group consisting of: identity of the first user, purchasing habits of the first user, service status of the first user, and viewing preferences indicated in said first user profile.

18. The computer-readable medium of claim 12, wherein said additional frames of video include
 at least one member selected from the group consisting of: advertisements, personalized statements regarding said first user's bill, and information regarding special promotions.

19. The computer-readable medium of claim 12, wherein said original series of frames of digital information are physically stored in more than one file.

20. The computer-readable medium of claim 12, wherein said first customized digital data stream includes video information corresponding to closed captioned text in a language indicated in said first user profile.

21. The computer-readable medium of claim 12, where said first customized digital data stream includes audio translations in a language indicated in said first user profile.

22. The computer-readable medium of claim 12, where said first customized digital data stream includes video information corresponding to a letterbox version of said specified content.

* * * * *

UNITED STATES PATENT AND TRADEMARK OFFICE
CERTIFICATE OF CORRECTION

PATENT NO. : 6,944,585 B1
DATED : September 13, 2005
INVENTOR(S) : David J. Pawson It is certified that error appears in the above-identified patent and that said Letters Patent is hereby corrected as shown below:

Column 8,
Lines 23 and 24, delete "sending delivering said" and insert -- sending said --.

Column 9,
Line 2, delete "content by said from" and insert -- content from --.

Signed and Sealed this

Twenty-ninth Day of November, 2005

JON W. DUDAS
*Director of the United States Patent and Trademark Office*